United States Patent [19]

Jördens

[11] Patent Number: 4,653,734
[45] Date of Patent: Mar. 31, 1987

[54] HYDRAULIC VIBRATION DAMPER FOR RESILIENT BEARINGS IN MOTOR VEHICLES

[75] Inventor: Ernst-Günter Jördens, Damme, Fed. Rep. of Germany

[73] Assignee: Lemförder Metallwaren AG, Fed. Rep. of Germany

[21] Appl. No.: 686,204

[22] Filed: Dec. 26, 1984

[30] Foreign Application Priority Data

Dec. 28, 1983 [DE] Fed. Rep. of Germany ....... 3347274

[51] Int. Cl.⁴ .................... B60G 15/04; F16K 13/00; B60K 5/12; B62D 33/06
[52] U.S. Cl. .................................... 267/8 R; 248/562; 267/140.1
[58] Field of Search ................. 267/8 R, 35, 113, 124, 267/129, 140.1, 140.2, 140.3, 140.5, 141, 141.2, 141.4; 188/311, 313, 322.13, 322.15, 298; 180/300; 248/562, 631, 634, 636; 92/97; 137/513.7

[56] References Cited

U.S. PATENT DOCUMENTS 2,966,351 12/1960 Scholz .............................. 188/298 X
4,159,091 6/1979 Le Salver et al. ............ 267/140.1 X
4,399,987 8/1983 Cucelli .............................. 267/140.1

FOREIGN PATENT DOCUMENTS 0040290 11/1981 European Pat. Off. ......... 267/140.1
3225700 11/1983 Fed. Rep. of Germany ... 267/140.1
2070730 9/1981 United Kingdom ........... 188/322.15

Primary Examiner—Duane A. Reger
Assistant Examiner—Robert J. Oberleitner
Attorney, Agent, or Firm—McGlew and Tuttle

[57] ABSTRACT

A hydraulic vibration damper is intended for resilient bearings in motor vehicles and comprises in a housing an inner space which is divided by a partition into a working space above and a lower equalization space, with the two spaces being connected to each other by flow apertures in the partition and their volumes being variable. The partition encloses a horizontal flow channel communicating with the working space and the equalizing space, respectively, through connecting holes which are offset relative to each other. In addition, valve apertures with closing bodies are provided in the partition, which close automatically under increased pressure in the working space.

1 Claim, 6 Drawing Figures

FIG. 1
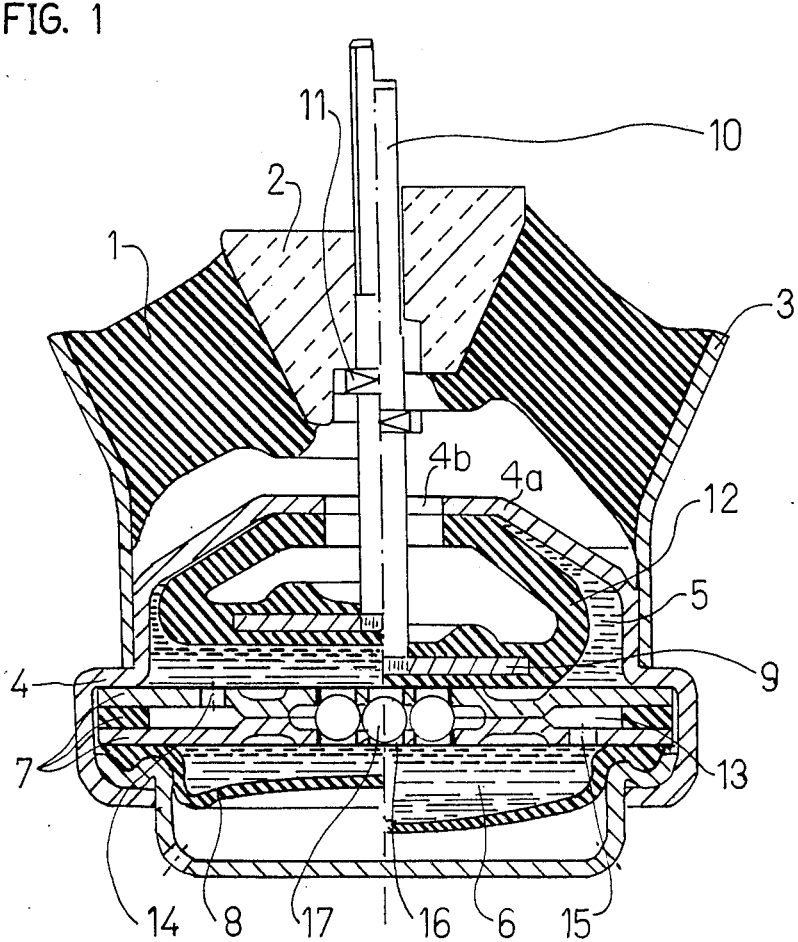
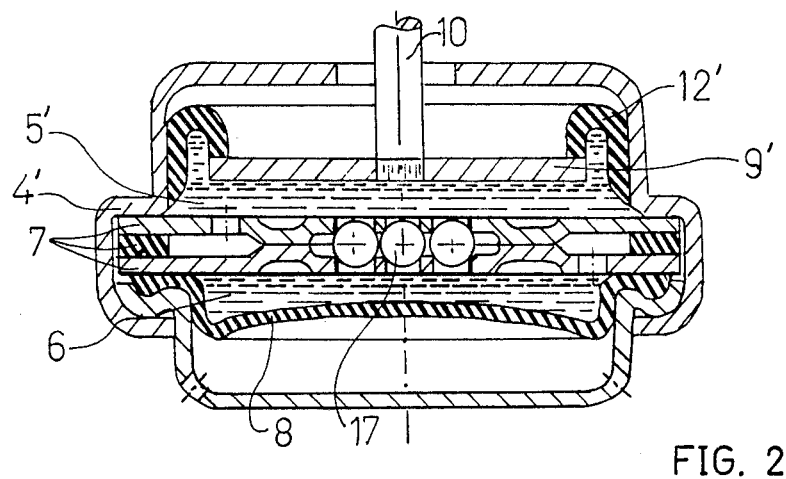
FIG. 2

4,653,734

HYDRAULIC VIBRATION DAMPER FOR RESILIENT BEARINGS IN MOTOR VEHICLES

FIELD AND BACKGROUND OF THE INVENTION

This invention relates in general to dampers and in particular to a new and useful hydraulic damper intended for mounting drive engines of vehicles.

Bearings of this kind are employed for damping and suppressing vibrations which are caused by the travel and by balance variations of the engine or other moving parts, and have very different amplitudes and frequencies. What is sought is to make the damping effective over a maximum frequency and amplitude range, mostly in cooperation with a cushioning resilient element.

Aimed at this goal is German Pat. No. 32 35 700 disclosing a resilient rubber bearing in which a cushioning member with an element of a resilient material, and a hydraulic damper are integrated with each other. In this prior art design, a working space of the damper is provided below the resilient element, which is separated by a partition with throttling holes, from an equalizing space, so that upon resilient deformations of the cushioning member, liquid is forced from the working space through the throttling holes into the equalizing space, and in the opposite direction when the cushioning member regains its shape. The loads taken up by the cushioning member thus become fully effective against the hydraulic damper. In view of the operation of the damper within a large frequency and amplitude range, the partition of this prior art damper is made of a resilient material and mounted between stiff gratings and is provided with slots which, independently of each other, form movable portions of the diaphragm and, at the same time, a partial cross-sectional area of throttling. The other part of the throttling cross-sectional area may be formed by a bore. The throttling bore is designed for small amplitudes, so that with an increasing pressure and augmented vibration amplitudes, the cross-sectional area of throttling is continuously enlarged as a function of the available differential pressure between the equalizing and working spaces.

SUMMARY OF THE INVENTION

The invention is directed to improvements in the throttling effect in the partition wall between the working space and the equalizing space, responsive to the varying frequencies and amplitudes of the load produced vibrations, and, particularly, better adapted to finely follow variations within the range of small amplitudes.

In accordance with the invention a hydraulic vibration damper for resilient bearings in motor vehicles comprises a housing which has a hollow interior forming a liquid space with a partition wall assembly extending across the working space and dividing an end to an upper working space and a lower equalizing space. In accordance with the invention the partition wall has a horizontally extending liquid flow space with an opening to the upper working space and another opening to the equalizing space which is offset from the first opening and thus requiring a horizontal flow through the partition wall from one space to the other. In addition, the partition wall assembly is provided with through apertures which are closable by valve members or flaps automatically upon pressure increase.

It is sought to combine the damper with a cushioning member including a resilient element and taking up the static load of the system, with the possibility of providing an integrated structure or preferably, a structure within which the damper and the cushioning member operate independently of each other.

The inventive design has the advantage that in the predominant normal operation, upon a suddenly occurring load causing a large amplitude, the valve apertures with their closing bodies are put out of function, and that the throttling channels remaining alone effective in such instances, produce a better effect than in the prior art design. This is because the liquid flow in the passages within the partition wall is deflected many times and directed through different cross-sectional areas, whereby the vibratory energy is dissipated. Ring segment (kidney-shaped) inlet and outlet throttling holes increase this defect.

As closing bodies for the valve apertures, ball floats have proved advantageous since they cause a very low friction of the liquid moving between the working space and the equalizing space. As soon as the amplitudes augment, the ball floats close the valve apertures. Instead of ball floats, diaphragms may be provided as the closing bodies on suitable occasions.

Accordingly, it is an object of the invention to provide an improved hydraulic vibration damper for resilient bearings in motor vehicles wherein an inner space is divided by a partition wall at a working space and an equalizing space, and both these spaces are variable in volume and the partition wall is provided with flow apertures in which the two spaces are connected to each other which are offset relative to each other and the partition wall is provided in addition with valve apertures having closing members by which they are closed automatically upon a pressure increase in the working space.

A further object of the invention is to provide a hydraulic vibration damper for resilient bearings which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a vertical sectional view of a resilient bearing comprising a cushioning member and a hydraulic damper;

FIG. 2 is a similar partial view of a hydraulic damper in another embodiment;

DESCRIPTION OF THE PREFERRED EMBODIMENTS

Figure 3:
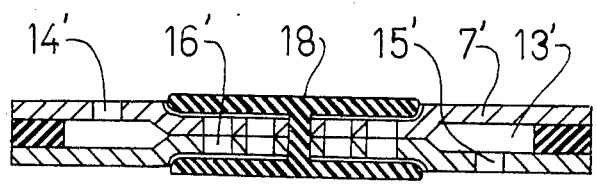
FIG. 3 is a sectional view, similar to FIG. 2 of another embodiment of the partition wall.

Referring to the drawings in particular the invention embodied in FIG. 1 comprises a hydraulic vibration damper for resilient bearings in motor vehicles made of a housing 4 which has a hollow interior forming a liquid space with a partition wall assembly 7 extending across the liquid space and dividing it into an upper working space 5 and a lower equalizing space 6. The partition wall has a horizontally extending liquid flow space 13 with an opening 14 to the upper working space 5 and another opening 15 to the equalizing space 6 which are offset from each other. The partition wall also has a valve aperture 16 having closure member 17 so that apertures are closed automatically upon a pressure increase or amplitude augmentation in the working space 5.

FIG. 1 shows a combination of a cushioning member with a hydraulic damper. The cushioning member comprising a body 1 of a resilient material which is clamped between an inner part 2 and an outer shell 3 and firmly bonded to these parts. Such a cushioning member is fitted to a top portion 4a of housing 4 of a hydraulic damper. Housing 4 of the hydraulic damper encloses in its upper portion the working space 5 and below, the equalizing space 6, with the two spaces being separated from each other by the partition wall assembly 7. Equalizing space 6 is entirely or partly bounded by a flexible case 8 or the like.

Figure 6:
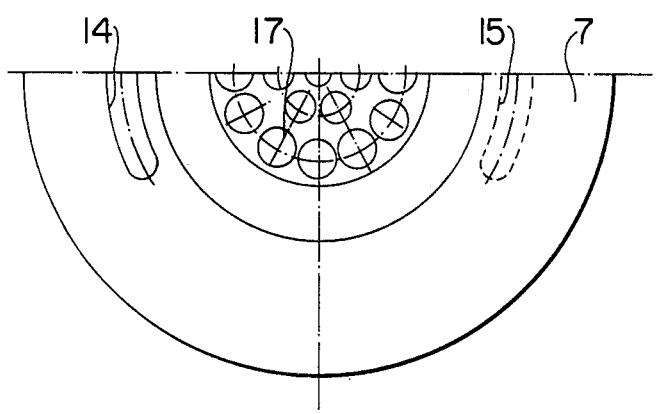
FIG. 6 is a top partial view of partition wall of FIG. 1.

Within working space 5, a piston 9 is accommodated and it is connected to a piston rod 10 which extends upwardly through an opening 4b of the housing 4 and through a bore of the inner part 2 for vertical movement therethrough. Upon a resilient deformation of the cushioning member, the piston rod can be secured to the constructional part to be supported. Piston rod 10 carries a collar 11 which serves as a protection against torsion and limits the vertical displacement of inner part 2 on piston rod 10, so that the piston rod is taken along with inner part to move piston 9 downwardly within working space 5. Piston 9 is isolated from the housing by a surrounding flexible case 12. With piston 9 moving downwardly, liquid from working space 5 is displaced into equalizing space 6. To this end, the liquid must pass through throttling holes provided in partition wall 7. The partition wall encloses the substantially horizontal flow channel 13 which communicates, at one side, through the connecting hole 14 with the working space 5, and at the other side, through the connecting hole 15 with the equalzing space 6, so that the liquid to be displaced from the working space 5 to the equalizing space 6 must pass through hole 14, flow channel 13, and hole 15. Viewed from above as shown in FIG. 6, connecting holes 14 and 15 preferably have a kidney-shaped cross section. In addition, valve apertures 16 are provided in partition wall 7, in which closing bodies are received which, according to the invention, may be embodied by ball floats 17. The balls 17 float in the liquid and permit a flow of the liquid between working space 5 and equalizing space 6 under very low friction. With larger amplitudes, due to the augmenting pressure, the ball floats seal the valve apertures 16 off, so that the liquid can further pass from working space 5 into equalizing space 6 only through connecting hole 15 and channel 13. To simplify the manufacture, a three-layer partition wall may be provided, as shown in FIGS. 1 and 2, which is correspondingly shaped to form channel 13 and the seats for ball floats 17.

Figure 4:
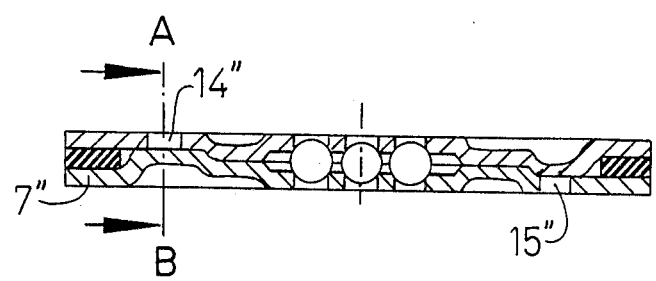
FIG. 4 is a sectional view of a further embodiment of the partition wall, with a detail in section.
Figure 5:
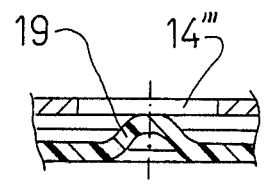
FIG. 5 is a section taken along line B—B of FIG. 4.

FIG. 2 shows that piston 9' in working space 5' and flexible case 12' for isolating the piston from housing 4' may be embodied otherwise. FIG. 3 shows that in suitable applications, diaphragms 18 may be substituted for ball floats 17 as bodies closing valve apertures 16'. Such diaphragms 18 may be provided above, below, or within partition wall 7' which has openings 14' and 15'. Instead of a flat diaphragm, a diaphragm with bulged portions for closing the valve apertures may be provided. FIGS. 4 and 5 show different designs of connecting holes 14", 15" and 14'" which viewed from above, may have a ring segment or kidney-shaped cross section as in FIG. 6, while the diaphragm may be provided with elevations 19 deflecting the flow. Connecting holes thus designed are advantageously offset relative to each other in the horizontal plane, so that an arcuate extension from almost zero up to 360° can be obtained for the channel in the wall. Finally, it is to be noted that in combinations of a damper with a cushioning member, flexible case 12 or 12' surrounding piston 9 or 9' should be much less stiff in the transverse and lengthwise directions than the cushioning member.

While specific embodiments of the invention have been shown and described in detail to illustrate the application of the principles of the invention, it will be understood that the invention may be embodied otherwise without departing from such principles.

What is claimed is:

1. A hydraulic vibration damper for resilient bearings of motor vehicles, comprising a housing having a hollow interior forming a liquid space, a partition wall assembly extending across said liquid space and dividing said liquid space into an upper working space and a lower equalizing space, flexible case means at least partly bounding said working space and said equalizing space for permitting changes in volume of said working and equalizing spaces, said partition wall assembly having a horizontally extending liquid flow space therein with a first kidney-shaped opening to said upper working space and a second kidney-shaped opening to said equalizing space, said first and second openings being offset at opposite sides of said partition wall assembly and on opposite sides of said horizontally extending liquid flow space, said partition wall assembly also having at least one first valve aperture communicating with said working space and at least one second valve aperture communicating with said equalizing space, and a closing member associated with said valve apertures to close one of said valve apertures upon a relatively large pressure increase in said working space so that liquid can flow from said working space to said equalizing space only through said first and second openings and across said horizontally extending liquid flow space, a relatively smaller pressure increase in said working space influencing said closing member to allow passage of liquid through said one valve aperture, said first and second valve apertures being vertically aligned with each other, said closing member comprising a ball float movable between said first and second valve apertures, said ball float being normally engaged with said first valve aperture and being moved downwardly upon occurrence of pressure in said working space, a large pressure increase in said working space causing said ball float to engage said second valve aperture to close said second valve aperture.

* * * * *